United States Patent
He et al.

(10) Patent No.: US 9,824,268 B2
(45) Date of Patent: Nov. 21, 2017

(54) MEDIA ITEM VALIDATION

(71) Applicant: NCR Corporation, Duluth, GA (US)

(72) Inventors: Chao He, Happy Valley (HK); Gary Ross, Scotland (GB)

(73) Assignee: NCR Corporation, Duluth, GA (US)

( * ) Notice: Subject to any disclaimer, the term of this patent is extended or adjusted under 35 U.S.C. 154(b) by 227 days.

(21) Appl. No.: 14/264,860

(22) Filed: Apr. 29, 2014

(65) Prior Publication Data

US 2015/0310268 A1  Oct. 29, 2015

(51) Int. Cl.
*G06K 9/00* (2006.01)
*G06K 9/52* (2006.01)
*G06K 9/62* (2006.01)
*G07D 7/20* (2016.01)
*G06K 9/20* (2006.01)

(52) U.S. Cl.
CPC .......... *G06K 9/00442* (2013.01); *G06K 9/52* (2013.01); *G06K 9/6215* (2013.01); *G06K 9/6267* (2013.01); *G07D 7/2016* (2013.01); *G06K 9/2018* (2013.01); *G06K 9/2027* (2013.01); *G06K 9/627* (2013.01); *G06K 9/6218* (2013.01)

(58) Field of Classification Search
None
See application file for complete search history.

(56) References Cited

U.S. PATENT DOCUMENTS

| | | | | |
|---|---|---|---|---|
| 2003/0030785 A1* | 2/2003 | Christophersen | ........ | G07D 7/12 356/71 |
| 2004/0247169 A1* | 12/2004 | Ross | .................... | G06K 9/6229 382/137 |
| 2007/0140551 A1* | 6/2007 | He | .......................... | G07D 7/20 382/159 |
| 2007/0278065 A1* | 12/2007 | Voser | ...................... | G07D 7/00 194/317 |
| 2009/0087077 A1* | 4/2009 | Nireki | ...................... | G07D 7/12 382/135 |
| 2011/0064279 A1* | 3/2011 | Uno | ........................ | G07D 7/12 382/112 |

FOREIGN PATENT DOCUMENTS

| | | | | | |
|---|---|---|---|---|---|
| GB | | 2355522 A | * | 4/2001 | ............. G07D 7/121 |
| JP | | 2005234702 A | * | 9/2005 | |

\* cited by examiner

*Primary Examiner* — Vikkram Bali
*Assistant Examiner* — Tracy Mangialaschi
(74) *Attorney, Agent, or Firm* — Schwegman, Lundberg & Woessner

(57) ABSTRACT

The present invention provides a method of validating a media item, the method comprising receiving image data corresponding to a plurality of digital images of a media item to be validated, wherein each image is associated with a respective one of a plurality of different channels of an illumination source for illuminating the media item, selecting image data corresponding to two of the plurality of images, dividing a common parameter of the selected image data associated with corresponding locations of the two selected images to create ratio image data representing a ratio image for two different channels of the illumination source, extracting feature information associated with the ratio image, and classifying the extracted feature information with at least one classifier of a validation template to determine whether or not the media item is valid. A computer program and a Self-Service Terminal for validating a media item, such as a banknote, are also provided.

13 Claims, 7 Drawing Sheets

MEDIA ITEM VALIDATION

FIELD OF THE INVENTION

The present invention relates to validating media items and, in particular, to the creation of a validation template used for validating media items and validating media items using a validation template.

Various situations are known in which media items are transported along different transport pathways in a Self-Service Terminal (SST). In a typical SST, such as a banknote depositing Automated Teller Machine (ATM), an ATM customer is allowed to deposit one or more banknotes (without having to place a banknote in a deposit envelope) in a publicly accessible, unattended environment. To deposit a banknote, the ATM customer inserts an identification card through a card slot at the ATM, enters the total value of banknotes being deposited, and inserts the banknote to be deposited through a deposit slot of a banknote acceptor. A transport mechanism receives the inserted banknote and transports the banknote in a forward direction along an infeed transport path to a number of locations within the ATM to process the banknote. One such location includes a validator which examines the banknote, or similar media item such as cheques, vouchers, coupons, or the like, for a number of purposes, including denomination recognition, counterfeit detection, banknote identification, or the like.

A conventional validator includes a transport mechanism for transporting a banknote along a transport path, a camera located on one side of the transport path to take an image of the banknote and an LED array located on the other side of the transport path for illuminating the banknote. In order to validate a banknote, pattern recognition techniques are conventionally used. A scanner or imager is typically used to capture images of a plurality of reference documents, such as genuine banknotes, and the captured images are used to define a reference template. By 'template' it is meant a representation of the reference images, which typically is a numerical or statistical representation of those images. Notes that are identified as genuine are accepted and all other notes, such as counterfeit banknotes, are rejected.

A known validation template is based on a representation of colour differences within the inks that cover a media item, such as a banknote. Four different light sensors are provided in a single validation unit and the captured image is represented by a six dimensional vector, each dimension being indicative of differences in intensity between signals received at two of the four sensors.

However, a significant variation in image intensity can occur across different validation units having different illumination sources and different sensors and in view of the reference template being previously created by a single and different apparatus. In turn, the genuine note acceptance rate (or true acceptance rate (TAR)) is significantly compromised. Multiple factors associated with each different validator unit which can contribute to such a problem relate to differences in sensor calibration, transport mechanisms and build quality inconsistencies. Improvements in template generation and media item validation techniques are therefore desirable.

SUMMARY OF THE INVENTION

It is an aim of the present invention to at least partly mitigate the above-mentioned problems.

It is an aim of certain embodiments of the present invention to provide a method and apparatus for generating a validation template to reduce or remove the image intensity variation across multiple media item validation units.

It is an aim of certain embodiments of the present invention to provide a method and apparatus for generating a validation template which improves the true acceptance rate (TAR) to around 99% without significantly compromising the false acceptance rate (FAR) performance.

It is an aim of certain embodiments of the present invention to provide a method of validation template generation which can be easily integrated with existing media item validation methods without compromising the automatic template generation process.

According to a first aspect of the present invention there is provided a method of validating a media item, the method comprising:
  receiving image data corresponding to a plurality of digital images of a media item to be validated, wherein each image is associated with a respective one of a plurality of different channels of an illumination source for illuminating the media item;
  selecting image data corresponding to two of the plurality of images;
  dividing a common parameter of the selected image data associated with corresponding locations of the two selected images to create ratio image data representing a ratio image for two different channels of the illumination source;
  extracting feature information associated with the ratio image; and
  classifying the extracted feature information with at least one classifier of a validation template to determine whether or not the media item is valid.

Aptly, the method further comprises:
  segmenting the ratio image using a segmentation map of the validation template;
  extracting feature information from each segment; and
  classifying the extracted feature information from each segment with a corresponding segment classifier of the validation template.

Aptly, the method further comprises:
  combining the extracted feature information from all segments; and
  classifying the combined extracted feature information from all segments altogether with a classifier of the validation template.

Aptly, the method further comprises:
  inputting the extracted feature information into one or more functions of the at least one classifier to produce an output; and
  comparing the output with at least one threshold parameter of the at least one classifier to determine whether or not the media item is valid.

Aptly, the at least one classifier is a one-class classifier.

Aptly, the one-class classifier uses a parametric $D^2$ test or a semi-parametric test based on a mixture of Gaussians.

Aptly, the validation template is selected from a plurality of validation templates responsive to a class of media item to be validated.

Aptly, the media item is a banknote and the class comprises currency, denomination, orientation, and design series.

Aptly, each validation template is created on the basis of information about a set of training ratio images of a plurality of media items of the same class.

Aptly, the segmentation map of a corresponding validation template is created by using a clustering algorithm to cluster locations of each corresponding ratio image using a plurality of media items of the same class.

Aptly, a one of the at least two selected images is associated with a green channel or a blue channel of the illumination source, and a remainder one of the at least two selected images is associated with an infrared channel of the illumination source.

Aptly, the corresponding locations each comprise at least one pixel.

Aptly, the common parameter comprises luminous intensity.

Aptly, the method further comprises:
adjusting at least one property of the ratio image.

According to a second aspect of the present invention there is provided a computer program comprising program instructions for validating a media item by the steps of:
receiving image data corresponding to a plurality of digital images of a media item to be validated, wherein each image is associated with a respective one of a plurality of different channels of an illumination source for illuminating the media item;
selecting image data corresponding to two of the plurality of images;
dividing a common parameter of the selected image data associated with corresponding locations of the two selected images to create ratio image data representing a ratio image for two different channels of the illumination source;
extracting feature information associated with the ratio image; and
classifying the extracted feature information with at least one classifier of a validation template to determine whether or not the media item is valid.

According to a third aspect of the present invention there is provided a Self-Service Terminal (SST) comprising:
at least one imaging device for capturing a plurality of digital images of a media item to be validated; and
a computing device that executes the computer program according to the second aspect of the present invention.

According to a fourth aspect of the present invention there is provided a method for creating a validation template for validating a media item, comprising:
obtaining image data corresponding to a plurality of digital images of a media item, wherein each image is associated with a different channel of an illumination source;
dividing a common parameter for corresponding locations of two of the plurality of digital images to generate ratio data representing a ratio image for two different channels of the illumination source; and
creating a validation template based on the ratio data of a plurality of media items of the same class.

Aptly, the common parameter comprises luminous intensity of corresponding pixels and the ratio data comprises intensity ratio data.

According to a fifth aspect of the present invention there is provided a method for creating a validation template for validating a media item, comprising:
obtaining at least two images of a media item, wherein each image is associated with a different channel of an illumination source;
calculating an image intensity ratio associated with the at least two images; and
creating a validation template based on the image intensity ratio.

According to a sixth aspect of the present invention there is provided a method of creating a validation template for validating a media item, comprising:
obtaining a plurality of images of a media item, wherein each image is associated with a respective one of a plurality of different channels of an illumination source for illuminating the media item;
segmenting each image into a number of corresponding segments using a segmentation map;
extracting information from corresponding locations of each corresponding segment to develop a feature set representing each segment; and
creating a validation template responsive to the feature sets for validating a media item.

Aptly, the method further comprises grouping the locations into clusters according to a defined similarity measurement to create a segmentation map of the validation template.

Aptly, the method further comprises introducing artificial noise to corresponding features of the captured images to broaden/compensate a determined feature distribution.

Aptly, the method further comprises generating a zero-mean multivariate Gaussian noise set and adding the noise set to each feature set.

According to a seventh aspect of the present invention there is provided a system for performing a method of creating a validation template according to any of the fourth, fifth or sixth aspects of the present invention.

According to an eighth aspect of the present invention there is provided a Self-Service Terminal (SST) for performing a method of creating a validation template according to any of the fourth, fifth or sixth aspects of the present invention.

According to a ninth aspect of the present invention there is provided a method of validating a media item, the method comprising:
receiving a plurality of captured images of a media item, wherein each image corresponds to a different channel of an illumination source for illuminating the media item;
selecting two of the plurality of images;
dividing corresponding image data associated with each of the two selected images to create ratio image data representing a ratio image;
segmenting the ratio image into a plurality of different segments;
comparing one or more of the segments of the ratio image with corresponding reference segments associated with a validation template; and
determining whether the media item is valid or invalid.

Aptly, the step of comparing further comprises:
classifying each segment of the ratio image to determine a classification value; and
comparing each classification value with a reference classification threshold for the corresponding segments associated with the validation template.

Aptly, the step of classifying comprises using a one-class classifier.

Aptly, the method further comprises determining the validity of each segment and combining the validity of a plurality of segments to determine the overall validity of the media item.

Aptly, a unanimous vote is used in which all of the segments considered have to be valid in order to provide an overall result that the media item is valid. Alternatively, a majority vote may be used in which only a majority of the segments considered have to be valid in order to provide an overall result that the media item is valid.

Aptly, the captured image or data associated with valid media items is used to update the validation template.

Certain embodiments of the present invention provide a method and apparatus for removing image intensity variation occurring across multiple media item validation units to maximise the genuine note acceptance rate (or true acceptance rate (TAR)).

Certain embodiments of the present invention provide a method of removing image intensity variation occurring across multiple media item validation units which is easily incorporated into known methods of media item validation and validation template creation.

Certain embodiments of the present invention provide a method of automated template generation without the need for counterfeit training notes to be used.

Certain embodiments of the present invention provide a method of automated template generation which avoids expensive hardware rework of conventional techniques and reduces the threshold for production quality control.

BRIEF DESCRIPTION OF DRAWINGS

Embodiments of the present invention will now be described hereinafter, by way of example only, with reference to the accompanying drawings in which.

DESCRIPTION OF EMBODIMENTS

Figure 1:
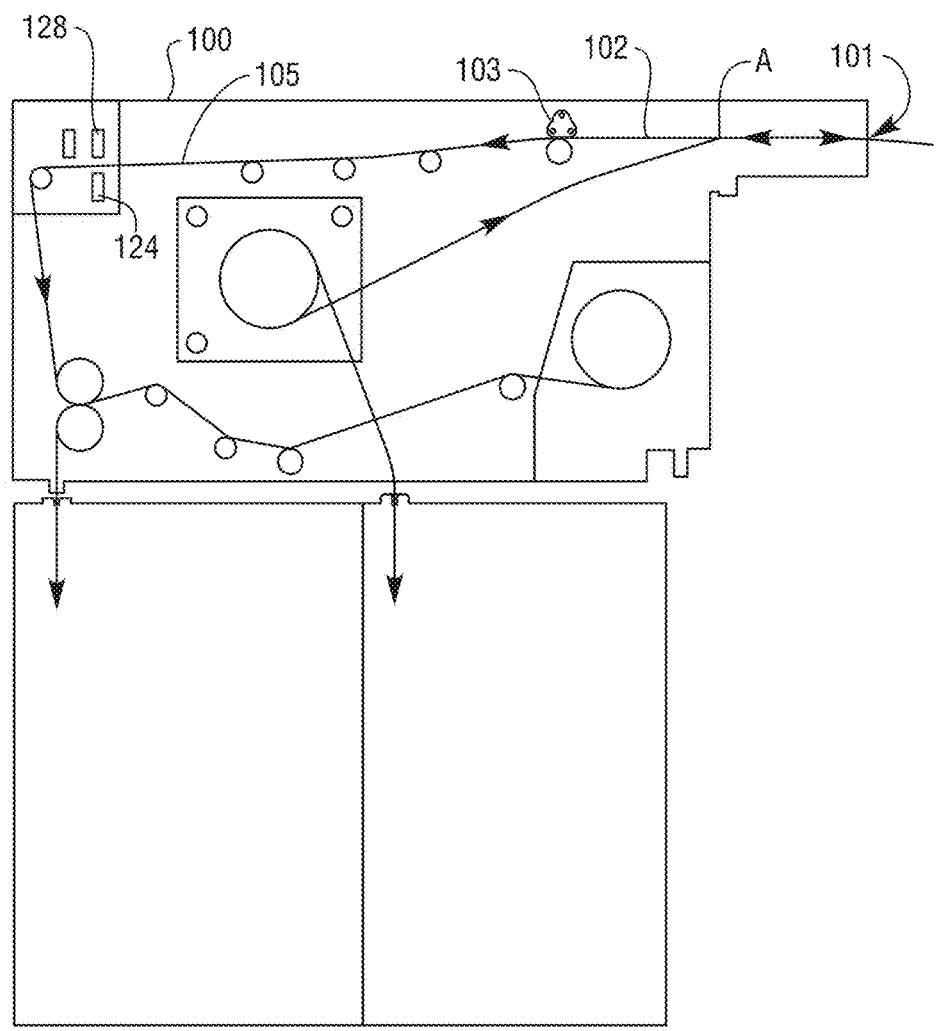
FIG. 1 illustrates a document processing module including a banknote validator module.

In the drawings like reference numerals refer to like parts.

As illustrated in FIG. 1, a document processing module 100 has an access mouth 101 through which incoming cheques and/or banknotes are deposited or outgoing cheques are dispensed. This mouth 101 is aligned with an infeed aperture of an Automated Teller Machine (ATM). A bunch of one or more banknotes or cheques is input or output via the infeed aperture of the ATM. Aptly, a bunch of a hundred items or more can be received/dispensed. Incoming banknotes or cheques follow a first transport path 102 away from the mouth 101 in a substantially horizontal direction from right to left as shown in FIG. 1. The first transport path 102 is also referred to as the infeed path. The banknotes or cheques then pass through a feeder/separator 103 and along another pathway portion 105 which is also substantially horizontal and right to left. The banknotes or cheques then individually enter a validator module which includes an illumination source 124 and an imager 128.

Figure 2:
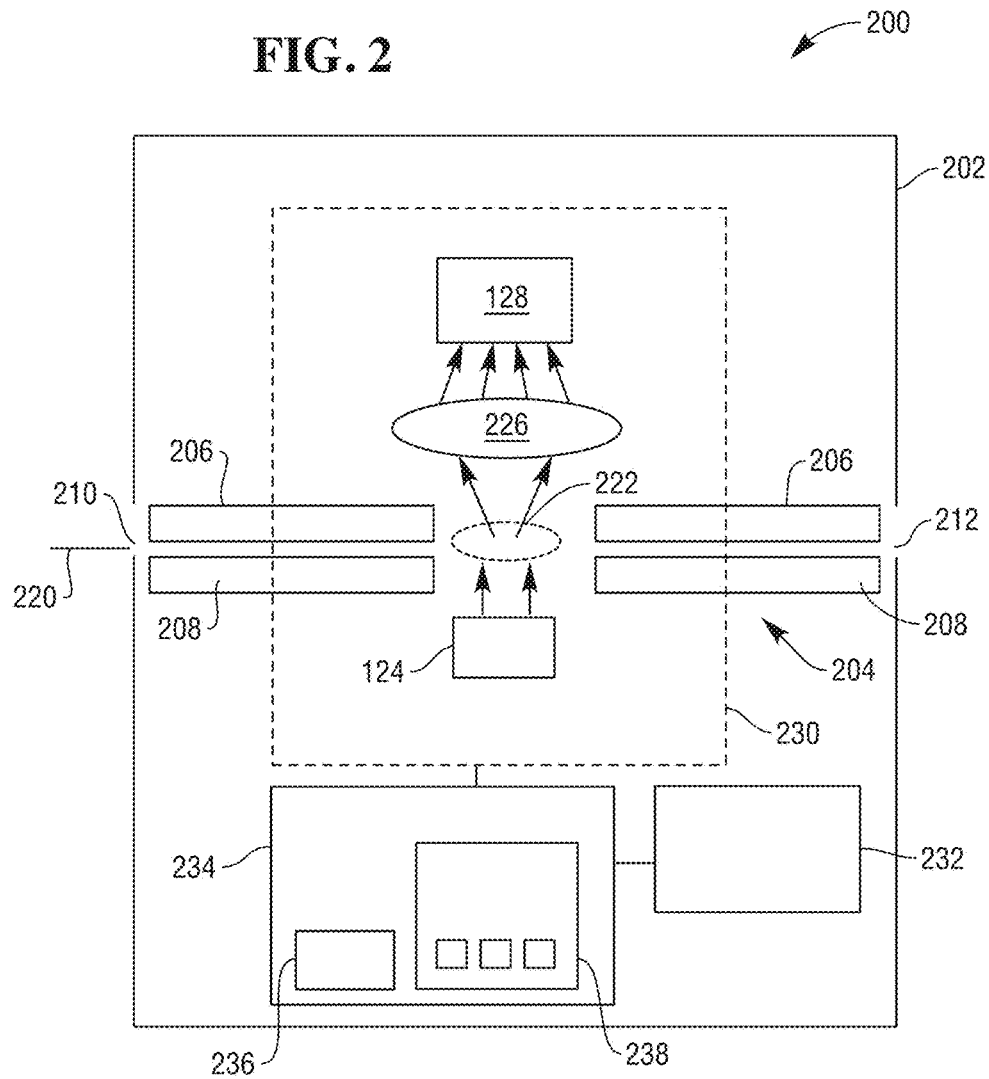
FIG. 2 illustrates a schematic diagram of a validator module according to one embodiment of the present invention for validating a banknote.

FIG. 2 illustrates a validator module 200 (in the form of a banknote validator) for implementing, inter alia, a method of generating a validation template for validating media items according to one embodiment of the present invention.

The banknote validator 200 includes a housing 202 which supports a transport mechanism 204 in the form of a train of pinch rollers 206, 208 extending from an entrance port 210 to a capture port 212. The pinch rollers include upper pinch rollers 206 aligned with and spaced apart from lower pinch rollers 208. The entrance and capture ports 210, 212 are in the form of apertures defined by the housing 202. In use, the capture port 212 would typically be aligned with parts of a depository module.

In use, the pinch rollers 206, 208 guide a media item (in this embodiment a banknote) 220 short edge first through an examination area 222 defined by a gap between adjacent pinch roller pairs. While the banknote 220 is being conveyed through the examination area 222, the banknote 220 is illuminated selectively by an illumination source, or more specifically a source of electromagnetic radiation. The illumination source 124 includes a linear array of LEDs arranged to illuminate across the short edge of the bank note 220. Aptly, three sources of illumination are provided; a first illumination source located to reflect light off a front surface of the banknote, a second illumination source located to reflect light off a rear surface of the banknote, and a further illumination source located to transmit light through the banknote. For simplicity, FIG. 2 shows the transmission illumination source only.

Aptly, each illumination source comprises an array of LEDs, wherein each LED emits a different frequency (channel) of radiation. Aptly, each of the two reflective illumination sources comprises a red LED, a green LED, a blue LED and an infrared LED. Aptly, the transmission illumination source comprises at least a green LED and an infrared LED.

Each illumination source is associated with a respective sensor for detecting a respective channel of radiation which is reflected off the surface of the banknote or transmitted through the banknote. For example, as shown in FIG. 2, a CCD Contact Image Sensor (CIS) 128 is located on an opposite side of the banknote 220 to the LEDs for detecting an infrared channel of the radiation source for transition measurements. When the LEDs are illuminated, the omitted infrared radiation channel is incident on an underside of the banknote 220 and an optical lens 226 focuses light transmitted through the banknote 220 to the CIS 128 which provides a transmitted infrared channel output from the optical imager 128. The illumination source 124, lens 226 and imager 128 define an image collection component 230. Again, for simplicity, only the transmission sensor is shown in FIG. 2 and reflection sensors for detecting reflective radiation are also provided.

The banknote validator 200 also includes a data and power interface 232 for allowing the banknote validator 200 to transfer data to an external unit, such as an ATM, a media depository (not shown), or a computer (not shown), and to receive data, commands, and power therefrom. The banknote validator 200 will typically be incorporated into a media depository, which would typically be incorporated into an ATM.

The banknote validator 200 also includes a controller 234 including a Digital Signal Processor (DSP) 236 and an associated memory 238. The controller 234 controls the pinch rollers 206, 208 and the image collection components 230 (including energising and de-energising the illuminating source 124). The controller 234 also collates and processes channel transmission data captured by the respective cameras and communicates this data and/or results of any analysis of this data to the external processing unit (not shown) via the data and power interface 232.

Figure 3:
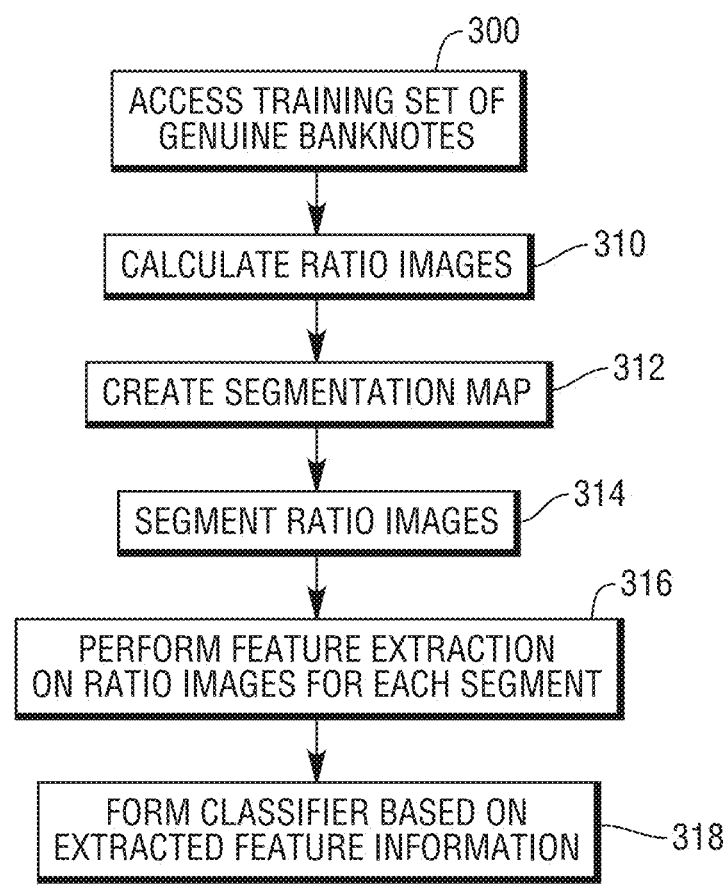
FIG. 3 shows the steps of creating a validation template in accordance with certain embodiments of the present invention.

FIG. 3 shows the steps of creating a validation template in accordance with certain embodiments of the present invention. As a first step 300, a set of training images of genuine banknotes is accessed. These images are of genuine banknotes of the same currency, denomination, orientation, and design series. In one embodiment of the present invention, two reflective cameras are provided (one camera above and one camera below a banknote to be scanned) and one transmission camera is provided above or below a transport path along which a banknote to be imaged is transported. The cameras are multi-spectral to detect the different channels of radiation being reflected off or transmitted through the banknote. In this embodiment, four reflection images (red, blue, green, and IR channels) are captured by the first reflective camera, four reflection images (red, blue, green, and IR channels) are captured by the second reflective camera, and two transmission images (green and IR channels) are captured by the one transmission camera. Thus, ten images of each banknote are captured in total by the three cameras in association with the respective illumination sources. Each captured image is a UINT8 (Unsigned Integers 8 bits of Information) data image comprising a corresponding number of pixels.

Figure 4:
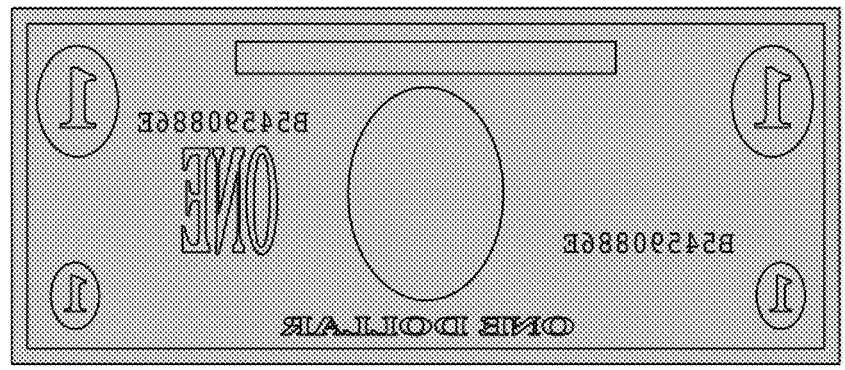
FIG. 4 illustrates a captured image of a genuine banknote associated with the blue channel of a corresponding illumination source located to reflect light off a front surface of the banknote (Blue Reflection Front (BRF))
Figure 5:
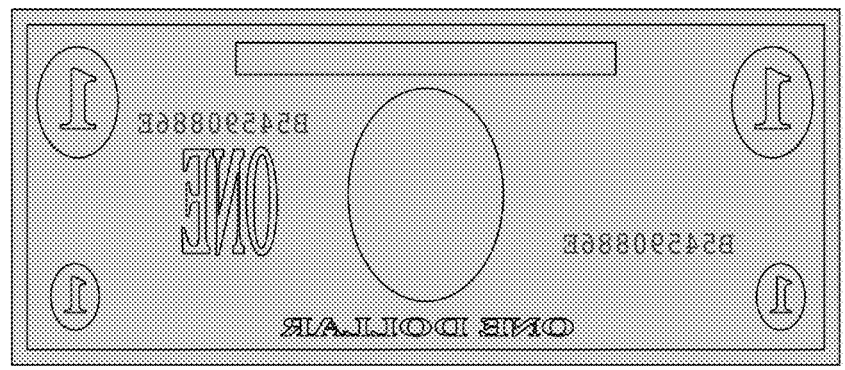
FIG. 5 illustrates a captured image of a genuine banknote associated with the infrared channel of the same illumination source as that associated with the image of FIG. 4, i.e. the source which is located to reflect light off the front surface of the banknote (Infrared Reflection Front (IRF))

As a next step 310, for each banknote in the training set, an intensity ratio image is calculated for the selected channels of the illumination source. The image data associated with two images of each banknote captured by the same camera are selected, wherein each image is associated with a different channel of the respective illumination source. For example, the two selected images may have been captured by one of the reflection cameras and may be associated with the blue and infrared channels respectively, i.e. blue reflection front (BRF) and IR reflection front (IRF), as shown for example in FIGS. 4 and 5, of the illumination source corresponding with that reflection camera.

Figure 6:
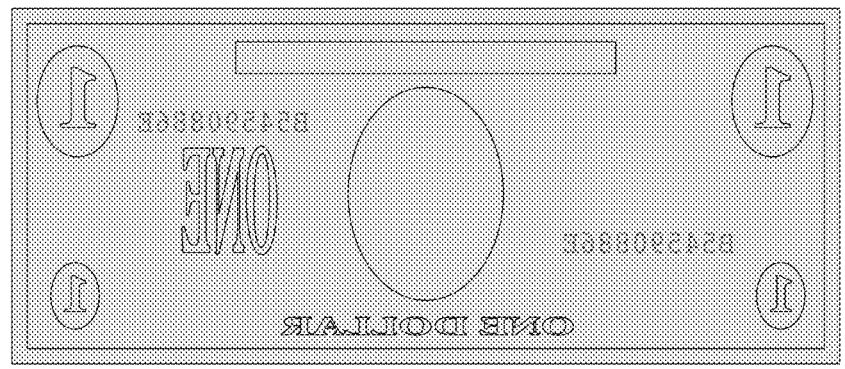
FIG. 6 illustrates a calculated ratio image for BRF/IRF.

The intensity of corresponding pixels of the two selected images is divided and the ratio is stored. Ratio image data is then formed representing a ratio image, as shown in FIG. 6, and the ratio in intensity between the two selected images. Aptly, the ratio image is a 64-bit decimal format image. It will be understood that other ratio images are obtainable and that from, for example, two reflection cameras and one transmission camera, thirteen different ratio images are achievable (six ratio images from the first reflection camera, six ratio images from the second reflection camera, and one ratio image from the one transmission camera).

Since most of the pixels intensity values of the red, green and blue channel images at a corresponding location are very similar, the intensity value at the same location of the ratio image (FIG. 6) will be around 1. Thus, a contrast stretch is required to bring the intensity values of the ratio image pixels back to the full intensity range of 0 to 255.

Figure 7:
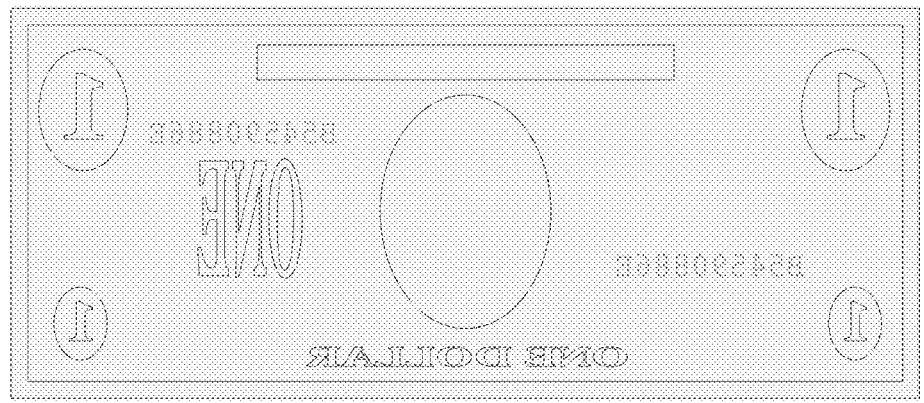
FIG. 7 illustrates the ratio image of FIG. 6 after the contrast has been adjusted.

As a next step, as shown in FIG. 7, the contrast of each ratio image is optionally adjusted and the ratio image is converted into a UINT8 type image. This step uses known image enhancement techniques to remap the intensity values in the grayscale ratio image as shown in FIG. 6 to new intensity values as shown in FIG. 7, such that $\alpha\%$ (e.g. $\alpha=1$) of data is saturated at low and high intensities, and the rest data will be linearly transformed to fill the entire intensity range [0, 255]. This increases the contrast of the output image to normalise the image. The $\alpha\%$ of pixels located in the darker portions of the adjusted ratio image in FIG. 7 are adjusted to be all the same intensity 0 and likewise the $\alpha\%$ of pixels located in the lighter portions of the adjusted ratio image ratio are adjusted to be all the same intensity 255.

As a next step, the boundaries of each adjusted ratio image are optionally cropped by a predetermined number of pixels to remove any 'noise' at the edges of the image which is caused by imperfections, such as tears, staining, defects or the like, of the corresponding genuine banknote which has been scanned.

Figure 8:
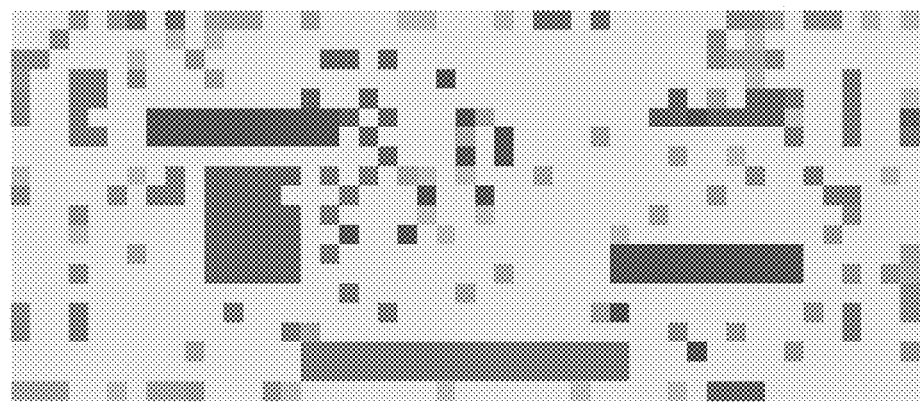
FIG. 8 illustrates a cropped, resized, down-averaged and contrast-stretched ratio image.

As a next step, the adjusted ratio image is optionally down averaged to reduce any anomalies, i.e. to average out any further noise. This step also reduces the data size of the image and in turn reduces the computing space and time which is required to store and process the adjusted ratio image data respectively. The small ratio image is also contrast stretched again as shown in FIG. 8.

After the small ratio images are created for all selected ratios and for each image of the set of training images, feature extraction steps such as segmentation (at step 314) and statistical value calculation can be applied, as those described for example in U.S. Pat. No. 8,086,017.

At step 312, a segmentation map is created using information from the set of ratio images corresponding to the plurality of training images used and selected channels of the illumination source. The segmentation map comprises information about how to divide each ratio image into a plurality of segments. The segments may be non-continuous, that is, a given segment can comprise more than one patch in different regions of the ratio image. The segmentation map is formed in any suitable manner and examples of some methods are given in detail below. For example, the segments are formed based on a distribution of the amplitudes of each pixel and the relationship to the amplitudes of the other pixels that make up the image across a plurality of images used in a training set of images.

Figure 9:
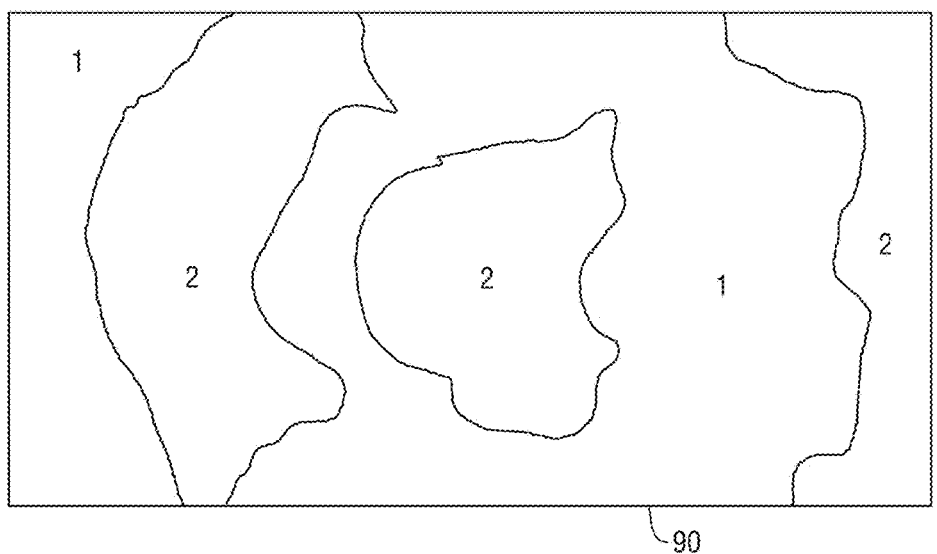
FIG. 9 illustrates a schematic diagram of a segmentation map for two segments.

Preferably, but not essentially, the segmentation map also comprises a specified number of segments to be used. For example, FIG. 9 is a schematic representation of a segmentation map 90 having two segments labeled 1 and 2 in the Figure. The segmentation map corresponds to the surface area of a banknote with segment 1 comprising those regions marked 1 and segment 2 comprising those regions marked 2. A one segment map would comprise a representation of the whole surface area of a banknote. The maximum number of segments, in the case that each pixel is a segment, would be the total number of pixels in an image of a banknote. Using segmentation maps of different numbers of segments yields different results. In addition, as the number of segments increases, the processing required per banknote increases. Trials may be carried out during training and testing (if information about counterfeit notes is available) in order to select an optimum number of segments for the segmentation map.

For example, consider the ratio images associated with the same ratio channel (one ratio channel is defined by the two image channels used for producing this ratio) of a plurality of banknotes of the same class (same currency, denomination, orientation, and design series) being stacked and in registration with one another in the same orientation. Taking a given pixel position in the note image plane this pixel position is thought of as having a "pixel intensity profile" comprising information about the pixel intensity at that particular pixel position in each of the training set images. Using any suitable clustering algorithm, pixel positions in the image plane are clustered into segments, where pixel positions in a same segment have similar or correlated pixel intensity profiles.

In one embodiment, these pixel intensity profiles are used but it is not essential to use pixel intensity profiles; it is also possible to use other information from all the ratio images. For example, the mean, median, maximum, or minimum intensity profiles calculated using a block of neighboring pixels for pixels at the same location in each of the ratio images. The size of the neighboring block can be set to 3 by 3, 4 by 4 or 5 by 5 and so on.

Given an ensemble of images $\{I_i\}$ i=1, 2, ..., N which have been registered and scaled to the same size r×c, each image $I_i$ can be represented by its pixels as $[a_{1i}\ a_{2i}\ \ldots\ a_{Mi}]^T$ in vector form, where $a_{ji}$ (j=1, 2, ..., M) is the intensity of the jth pixel in the ith image and M=r·c is the total number of pixels in the image. A design matrix $A \in R^{M \times N}$ can then be generated by stacking vectors $I_i$ (zeroed using the mean value) of all images in the ensemble, thus $A=[I_1, I_2, \ldots, I_N]$. A row vector $[a_{j1}, a_{j2}, \ldots, a_{jN}]$ in A can be seen as an intensity profile for a particular pixel location (jth) across N images. If two pixels come from the same pattern region of the image they are likely to have the similar intensity values and hence have a strong temporal correlation. Note the term "temporal" here need not exactly correspond to the time axis but is borrowed to indicate the axis across different images in the ensemble. Our algorithm tries to find these correlations and segments the image plane spatially into regions of pixels that have similar temporal behavior. We measure this correlation by defining a metric between intensity profiles. A simple way is to use the Euclidean distance, i.e. the temporal correlation between two pixels j and k can be denoted as:

$$d(j,k) = \sqrt{\Sigma_{i=1}^{N}(a_{ji}-a_{ki})_2}$$

The smaller d(j,k), the stronger the correlation between the two pixels.

In order to decompose the image plane spatially using the temporal correlations between pixels, a clustering algorithm is run on the pixel intensity profiles (the rows of the design matrix A). It will produce clusters of temporally correlated pixels. The most straightforward choice is to employ the K-means algorithm, but it could be any other clustering algorithm. As a result, the image plane is segmented into several segments of temporally correlated pixels. This can then be used as a map to segment all ratio images; and a classifier can then be built on features extracted from those segments of all corresponding ratio images of banknotes in the training set.

At step 314, using the segmentation map, each corresponding ratio image is segmented before feature extraction techniques are applied (step 316) to extract one or more features from each segment in each of the ratio images. By the term "feature" we mean any statistic or other characteristic of a segment. For example, the mean pixel intensity, median pixel intensity, mode of the pixel intensities, texture, histogram, Fourier transform descriptors, wavelet transform descriptors and/or any other statistics in a segment.

The extracted feature information for each corresponding segment may be combined to derive parameters and thresholds for a classifier to be used for validating a banknote.

At step 318, at least one classifier is formed using the extracted feature information. Any suitable type of classifier can be formed as known in the art, such as those described in U.S. Pat. No. 8,086,017. In one embodiment of the present invention, the classifier is a one-class classifier and no information about counterfeit banknotes is needed. However, it is also possible to use a binary classifier or other type of classifier of any suitable type as known in the art. Preferably the method of forming the classifier is repeated for different numbers of segments and tested using images of banknotes known to be either counterfeit or not. The number of segments giving the best performance and its corresponding set of classification parameters are selected. The optimal number of segments may be from about 2 to 15 for most currencies, although any suitable number of segments can be used.

The method according to certain embodiments of the present may enable a validation template for validation of banknotes of a particular class (same currency, denomination, orientation, and design series) to be formed simply, quickly and effectively. To create templates for other currency classes, the method is repeated with appropriate training sets of images.

The step of image segmentation analyses all images for a given currency class, so that spatial positions with similar profiles will be grouped together to define a validation template for a particular currency class. This ensures that any features extracted from the pixels of a same group will be stable across all training notes for this currency class, but distinctive between the currency classes.

Conventional validation template creation methods use only a chosen single channel (e.g. infrared transmission) for the segmentation step. This is effective when the image channels across multiple validation units behave in a similar manner. However, as described above, different channels across multiple validation units of different self-service terminals behaved incoherently. A further aspect of the present invention provides a method of using all validation channels together for segmentation where the values of all channels of all genuine notes for all corresponding pixel locations are aligned into a matrix A. Each row vector $[a_{j1}, \ldots, a_{jN}, a_{j(N+1)}, \ldots, a_{j(2N)}, \ldots, a_{j(LN)}]$ in A can be seen as an intensity profile for a particular pixel location (jth) across N images of L channels. Clustering techniques can then be applied to group these row vectors (pixel locations) into clusters according to a defined similarity measurement. As a result, the pixel locations of a banknote class are effectively segmented into coherent groups spatially. By using all channels for the segmentation step ultimately translates into improved performance of the banknote validation process. This method of segmentation may be applied directly to original captured images of a banknote or to ratio images (as described above), wherein each ratio image is regarded as a channel.

A further aspect of the present invention relates to feature extraction techniques during the validation template creation process. No matter how good a feature extraction method is, if the raw data itself is not consistent across multiple validation modules, it will not work effectively. Therefore, means of improving feature consistency are desired. A further aspect of the present invention provides a feature extraction method which comprises introducing artificial noise to the original features of the captured images to broaden/compensate the feature distribution so that the overlaps between the feature distributions of multiple validation modules will be increased or, in other words, the feature distribution shifts found across multiple validation modules will be reduced.

A variety of approaches of adding noise and at what level can be applied, such as adding noise to raw images globally, adding noise to raw images locally, e.g. particular regions that may be affected by transport mostly, and adding noise to extracted statistical features globally, and so on. Adding noise to features globally will now be described as an example:

After features are extracted from the genuine banknote images (or ratio images), a zero-mean multivariate Gaussian noise set is generated and added to the original reference feature set F. This can be duplicated multiple times. If duplicating twice, the new reference set would be in the following form:

$$F_{new} = \begin{bmatrix} F \\ F + NoiseSet1 \\ F + NoiseSet2 \end{bmatrix}$$

The noise level is controlled by a covariance matrix. In a simplified diagonal form as shown below, each element $\sigma_i$ controls the noise level for each feature $F_i$. The larger $\sigma_i$ is, the higher the noise level will be.

$$C = \begin{bmatrix} \sigma_1 & & & \\ & \sigma_2 & & \\ & & \ddots & \\ & & & \sigma_N \end{bmatrix}$$

To make the process automatic, two effective self-adaptive methods are provided to set the optimal noise level:

According to certain embodiments of the present invention, the noise level of each feature is a small percentage of the standard deviation of the corresponding dimension of the original reference features, i.e. $\sigma_i = \delta \cdot STD(F_i)$, where $\delta$ is the percentage and $F_i$ denotes the i-th dimension (column) of the reference feature set F. This way, the noise level is adaptive, and the new feature set $F_{new}$ preserves the old relationships between the features in the original feature set. The noise level parameter $\delta$ can vary from 0% to 100%. 0% is equal to the original feature without adding any noises, wherein 100% is equivalent to double the variance of original feature, which may lead to 100% of X-BV genuine note TAR (true accept rate) but large counterfeit FAR (false accept rate) performance too.

In accordance with further embodiments of the present invention, noise levels can be dynamically determined according to a pre-defined median noise level $\bar{\sigma}$ as well as the median standard deviation of all features $\omega$=Median (STD(F)). The ratios of each feature's standard deviation to their median $\omega$ can be computed by:

$$\rho_i = STD(F_i)/\omega$$

Then, the corresponding required noise level can be defined as $\sigma_i = \bar{\sigma} \cdot \rho_i$. This ensures that all injected noises have a median of $\bar{\sigma}$ so that situations of excessive or insufficient noise injection can be avoided.

In practice, the methods described above for defining a template for validating a bank note and using that template to validate test notes may be implemented within a self-service environment, such as an ATM. In this way, the ATM can be trained in a simple and effective manner to create a reference template and use that template to validate deposits in a secure manner. This can be done without the need for human intervention, so that the entire process is automatic. In view of ratio images being used based on the captured images of a banknote associated with different channels of an illumination source, the variations/tolerance issues found across multiple validation modules of different ATMs is minimised and the TAR is increased.

A banknote validator according to certain embodiments of the present invention may comprise: an input arranged to receive image data corresponding to a plurality of images of a banknote to be validated, wherein each image is associated with a different channel of an illumination source for illuminating the banknote to be validated; a plurality of validation templates each comprising a segmentation map and at least one classifier; and a processor configured to: select image data associated with two of the plurality of images and create ratio image data representing a ratio image for two different channels; segment the ratio image using a segmentation map of a selected one of the validation templates; extract one or more features from each segment of the ratio image; and classify the banknote as being either valid or not responsive to the extracted features using the at least one classifier of the selected validation template.

A self-service terminal (SST) including a validator according to certain embodiments of the present invention may further comprise an imaging device for capturing the plurality of images of a banknote to be validated.

A plurality of different validation templates each corresponding to different currencies, denominations, orientations and design series and optionally including segmentation maps having different numbers of segments for segmentation optimisation purposes (as described in U.S. Pat. No. 8,086,017) may be stored locally at each SST or may be stored remotely for each SST to access/receive when required.

Figure 10:
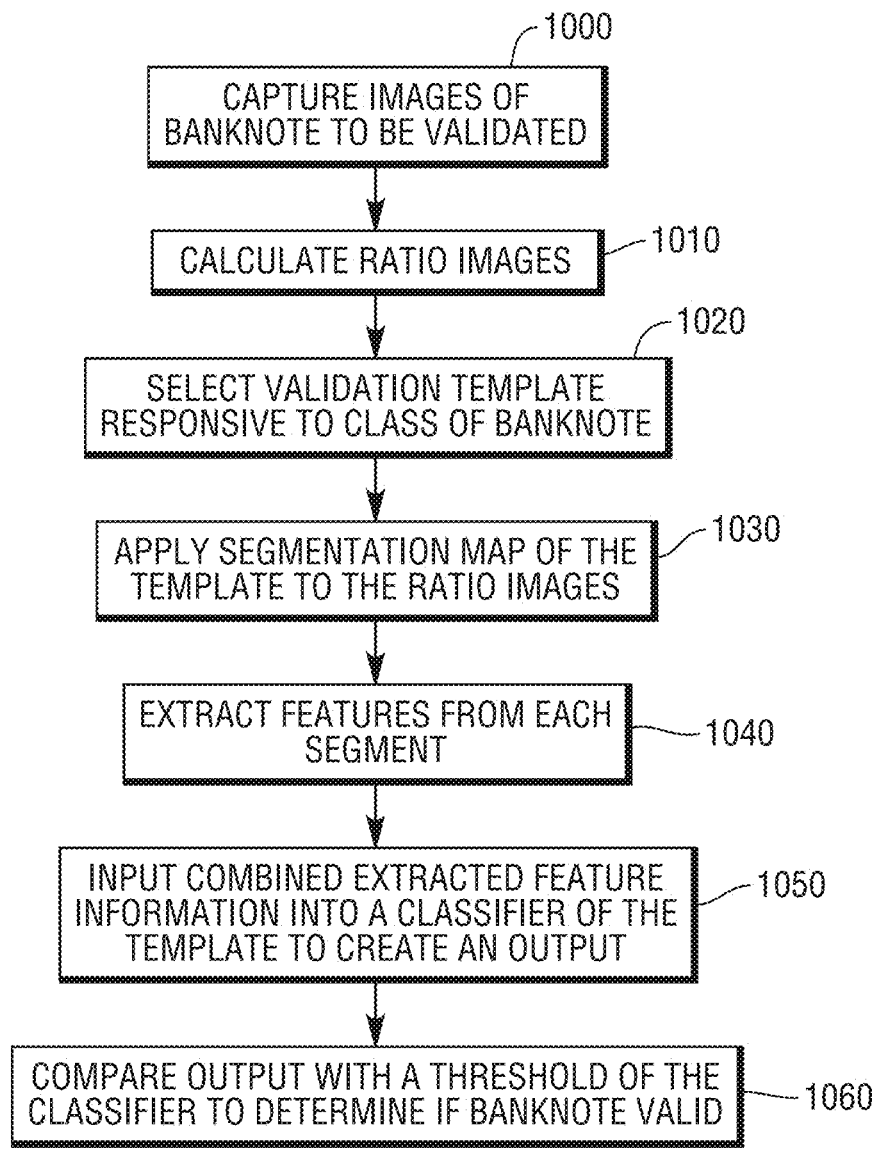
FIG. 10 shows the steps of validating a banknote in accordance with certain embodiments of the present invention using a validation template according to certain embodiments of the present invention.

FIG. 10 shows the steps of validating a banknote in accordance with certain embodiments of the present invention. As a first step 1000, a plurality of images of a banknote to be validated is captured at an SST. At step 1010, ratio images of the banknote to be validated are calculated corresponding to the selected channels. At steps 1020, a validation template is selected corresponding to the banknote to be validated. At step 1030, a segmentation map from a selected corresponding validation template for that banknote is applied to the ratio images to segment the ratio images into corresponding segments. At step 1040, feature information are extracted from each segment and combined. At step 1050, the combined feature information is input to at least one classifier of the validation template to produce an output value. At step 1060, the output value is compared against at least one threshold of the at least one classifier to determine if the banknote is valid or counterfeit.

Validation methods in accordance with certain embodiments of the present invention may significantly reduce the image intensity variation of banknote validator modules and improve the genuine note acceptance performance across different self-service terminals and respective validation modules thereof without compromising the counterfeit rejection performance.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

What is claimed is:

1. A method of validating a media item, the method comprising:
  receiving image data corresponding to a plurality of digital images of a media item to be validated, wherein each image is associated with a respective one of a plurality of different channels of an illumination source for illuminating the media item, each channel representing a different frequency of light emitted from the illumination source;
  selecting image data corresponding to two of the plurality of images, wherein the selecting the image data further includes converting the image data to pixel intensity values;
  dividing a common parameter of the selected image data associated with corresponding locations of the two selected images and creating ratio image data as a ratio image for a first channel of two different channels of the illumination source, wherein a first channel is represented as a first frequency of light that is reflected off the media item by a reflective first color of visible light that is produced by illuminating the media item with a green color of visible light with the first frequency of light captured for a first image of the media item, and a second channel of the two different channels is represented as a second frequency of light that is reflected off the media item by a second color of non-visible light that is produced by illuminating the media item with the second color of non-visible light with the second frequency of light captured for a second image of the media item, wherein the second color is infrared light, and wherein the ratio image data represents the pixel intensity values for the first and second images of the media item, and wherein the ratio image is the pixel intensity values present in the first image divided by the pixel intensity values present in the second image;
  extracting feature information associated with the ratio image: and
  classifying the extracted feature information with at least one classifier of a validation template to determine whether or not the media item is valid.

2. The method as claimed in claim 1, further comprising:
  segmenting the ratio image using a segmentation map of the validation template;
  extracting feature information from each segment; and
  classifying the extracted feature information from each segment with a corresponding segment classifier of the validation template.

3. The method as claimed in claim 1, further comprising:
  combining the extracted feature information from all segments; and
  classifying the combined extracted feature information from all segments with a classifier of the validation template.

4. The method as claimed in claim 3, further comprising:
  inputting the extracted feature information into one or more functions of the at least one classifier to produce an output; and
  comparing the output with at least one threshold parameter of the at least one classifier to determine whether or not the media item is valid.

5. The method as claimed in claim 1, wherein the at least one classifier is a one class classifier.

6. The method as claimed in claim 1, wherein the validation template is selected from a plurality of validation templates responsive to a class of media item to be validated.

7. The method as claimed in claim 6, wherein the media item is a banknote and the class comprises currency, denomination, orientation and design series.

8. The method as claimed in claim 6, wherein each validation template is created on the basis of information about a set of training ratio images of a plurality of media items of the same class.

9. The method as claimed in claim 6, wherein the segmentation map of a corresponding validation template is created by using a clustering algorithm to cluster pixel locations of each corresponding ratio image of a selected channel using a plurality of media items of the same class.

10. The method as claimed in claim 9, wherein the segmentation map of a corresponding validation template is created by using a clustering algorithm to cluster pixel locations of each corresponding ratio image of all ratio channels together using a plurality of media items of the same class.

11. The method as claimed in claim 1, wherein the common parameter comprises luminous intensity.

12. The method as claimed in claim 1, further comprising:
  adjusting at least one property of the ratio image.

13. A method of validating a media item, the method comprising:
  receiving image data corresponding to a plurality of digital images of a media item to be validated, wherein each image is associated with a respective one of a plurality of different channels of an illumination source for illuminating the media item;
  selecting image data corresponding to two of the plurality of images, wherein the selecting the image data further includes converting the image data to pixel intensity values;
  dividing a common parameter of the selected image data associated with corresponding locations of the two selected images and creating ratio image data as a ratio image for a first channel of two different channels of the illumination source represented by a reflective first color of visible light for a first image of the media item and a second channel of the two different channels of the illumination source represented by a reflective second color of non-visible light for a reflective infrared light of a second image of the media item, wherein the ratio image data represents the pixel intensity values present in the images, and the ratio image is the pixel intensity values present in the first image divided by the pixel intensity values present in the second image, and wherein the first channel is a first frequency captured as the reflective first color of light when the media item is illuminated with a green color of light and captured as the first image, and wherein the second channel is a second frequency captured as the reflective second color of light when the media item is illuminated with infrared light and captured as the second image;

extracting feature information associated with the ratio image: and classifying the extracted feature information with at least one classifier of a validation template to determine whether or not the media item is valid.

\* \* \* \* \*